(12) United States Patent
Rajan

(10) Patent No.: US 8,412,176 B2
(45) Date of Patent: Apr. 2, 2013

(54) METHOD FOR CONFIGURING MOBILE UNITS

(75) Inventor: N. Govinda Rajan, Huizen (NL)

(73) Assignee: Alcatel Lucent, Paris (FR)

( * ) Notice: Subject to any disclaimer, the term of this patent is extended or adjusted under 35 U.S.C. 154(b) by 841 days.

(21) Appl. No.: 11/559,053

(22) Filed: Nov. 13, 2006

(65) Prior Publication Data

US 2008/0113664 A1 May 15, 2008

(51) Int. Cl.
*H04W 4/00* (2009.01)
(52) U.S. Cl. .............. 455/422.1; 370/310.2; 370/312; 455/450
(58) Field of Classification Search ............ 455/456, 455/403, 41, 426, 436, 575, 414, 450; 375/132; 370/338, 347, 466, 310.2, 312; 379/433, 379/45
See application file for complete search history.

(56) References Cited

U.S. PATENT DOCUMENTS

| | | | | |
|---|---|---|---|---|
| 5,790,952 A * | 8/1998 | Seazholtz et al. | ......... | 455/432.1 |
| 6,729,929 B1 * | 5/2004 | Sayers et al. | ......... | 455/446 |
| 7,072,653 B1 * | 7/2006 | Sladek et al. | ......... | 455/432.3 |
| 7,706,332 B2 * | 4/2010 | Ozluturk et al. | ......... | 370/335 |
| 2002/0114305 A1 * | 8/2002 | Oyama et al. | ......... | 370/338 |
| 2003/0045293 A1 * | 3/2003 | Lee et al. | ......... | 455/442 |
| 2003/0092383 A1 * | 5/2003 | Moles et al. | ......... | 455/41 |
| 2003/0224772 A1 * | 12/2003 | Patzer et al. | ......... | 455/419 |
| 2004/0116140 A1 * | 6/2004 | Babbar et al. | ......... | 455/517 |
| 2004/0151133 A1 * | 8/2004 | Yi et al. | ......... | 370/312 |
| 2004/0224698 A1 * | 11/2004 | Yi et al. | ......... | 455/450 |
| 2005/0181808 A1 * | 8/2005 | Vaudreuil | ......... | 455/456.3 |
| 2006/0002338 A1 * | 1/2006 | Guo | ......... | 370/328 |
| 2006/0056354 A1 * | 3/2006 | Vasudevan et al. | ......... | 370/332 |
| 2006/0099965 A1 * | 5/2006 | Aaron | ......... | 455/456.3 |
| 2006/0187865 A1 * | 8/2006 | Sakai | ......... | 370/311 |
| 2006/0203746 A1 * | 9/2006 | Maggenti et al. | ......... | 370/254 |
| 2006/0285503 A1 * | 12/2006 | Mese et al. | ......... | 370/254 |
| 2007/0053331 A1 * | 3/2007 | Kolding et al. | ......... | 370/338 |
| 2007/0070908 A1 * | 3/2007 | Ghosh et al. | ......... | 370/236 |
| 2007/0104182 A1 * | 5/2007 | Gorti et al. | ......... | 370/352 |
| 2007/0298824 A1 * | 12/2007 | Ostman et al. | ......... | 455/522 |
| 2008/0019332 A1 * | 1/2008 | Oswal et al. | ......... | 370/338 |
| 2008/0261554 A1 * | 10/2008 | Keller et al. | ......... | 455/404.1 |
| 2009/0080351 A1 * | 3/2009 | Ryu et al. | ......... | 370/312 |

OTHER PUBLICATIONS

Sinha et al., "Mobile Location Awareness using Bluetooth and the Serendipty Server" available at: http://www-128.ibm.com/developerworks/library/wi-bluetooth Aug. 29, 2006.
Cell Phone Jammer From Wikipeida, the free encyclopedia available at: http: //en.wikipedia.org/wiki/Cell_phone_jammer. This page was last modified 15:21, Feb. 19, 2007.

* cited by examiner

*Primary Examiner* — Mahendra Patel
(74) *Attorney, Agent, or Firm* — Williams, Morgan & Amerson

(57) ABSTRACT

The present invention provides a method involving a base station and at least one mobile unit. The mobile unit is configured for communication with the base station using a first wireless communication medium. The method includes providing, over the first wireless communication medium, information indicating a modification to at least one configuration profile of the mobile unit. The configuration profile is associated with the first communication medium and the modification can be implemented by the mobile unit without user intervention.

18 Claims, 3 Drawing Sheets

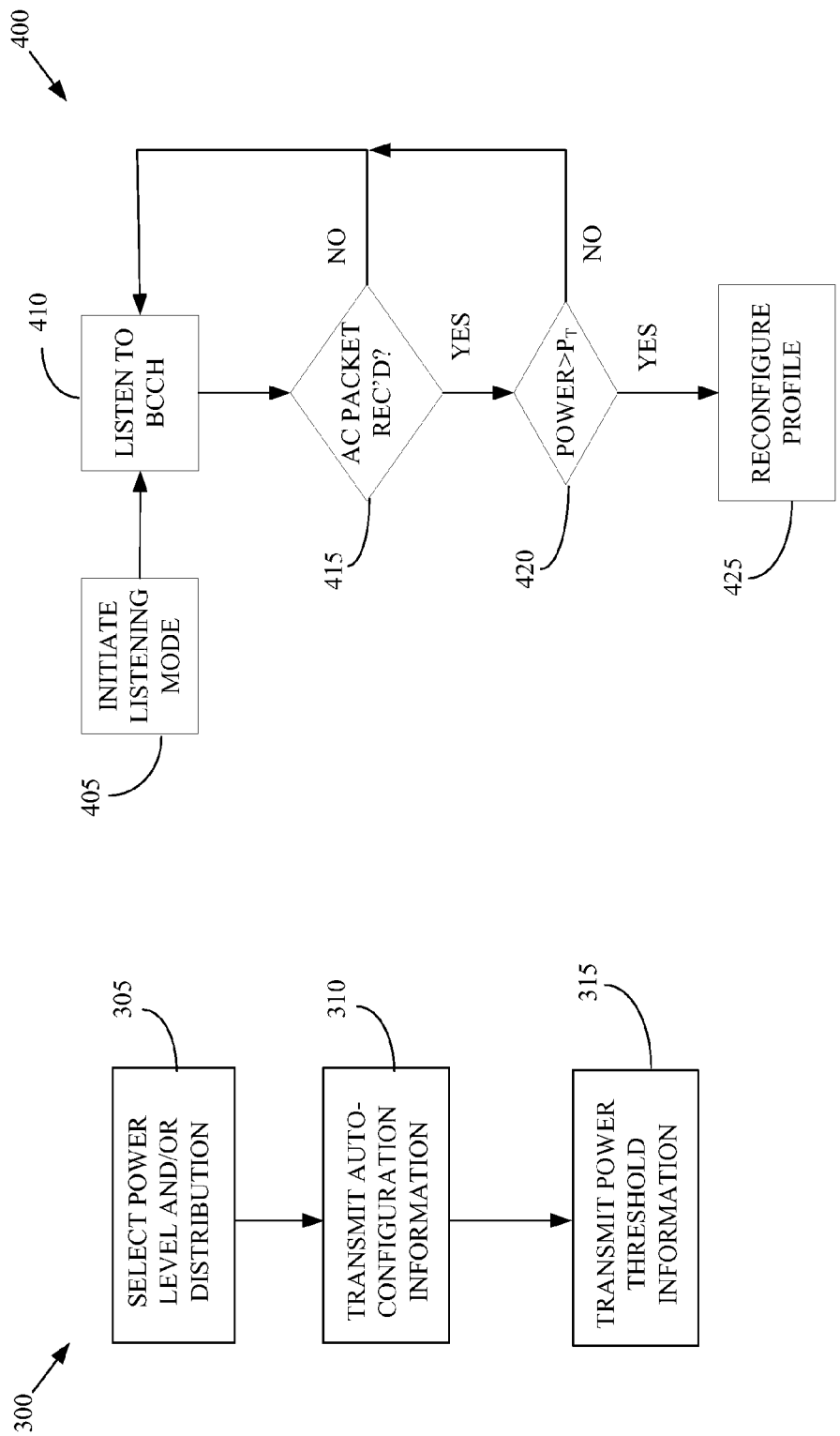

METHOD FOR CONFIGURING MOBILE UNITS

BACKGROUND OF THE INVENTION

1. Field of the Invention

This invention relates generally to communication systems, and, more particularly, to wireless communication systems.

2. Description of the Related Art

Wireless communication systems typically include one or more base stations, access points, or base station routers for providing wireless connectivity to mobile units. One of the most common types of mobile unit is a cellular telephone, which is typically used for voice communications between people. Other than the fact that the cellular telephones transmit signals over an air interface between the mobile unit and the wireless network, cellular telephones operate very much like their conventional wired counterparts. In particular, cellular telephones ring, or provide some other kind of auditory signal, to indicate an incoming a call. Although a ring can be a very effective signal in some contexts, in other contexts the unexpected ringing of a cellular telephone can be a cause of great annoyance and/or embarrassment. For example, a cellular telephone's ringtone rendition of Tchaikovsky's 1812 Overture may be particularly unwelcome during a performance of Barber's Adagio for Strings.

Mobile units may be operated in either a silent mode or a vibration mode so that incoming calls do not cause a sound to be produced. Visitors to public places, such as restaurants, hospitals, movie theaters, and the like, are often requested to set their mobile telephones in the silent mode or the vibration mode so as not to disturb the other visitors. Even though a majority of people set their phones in the silent mode, very often people either forget to set their phone in the requested mode or deliberately leave the phone in the ringing mode. In either event, ringing of these phones may cause embarrassment and/or irritation. Jamming of incoming radiofrequency signals may be used to disable mobile terminals and/or to prevent any incoming calls from reaching the cellular phone. However, jamming also prevents urgent calls from reaching users and prevents users from placing emergency calls.

One potential solution to this problem is to use a Bluetooth transmitter to provide a signal to instruct Bluetooth-capable cellular telephones to switch from the ringing mode to the silent or vibratory mode. However, Bluetooth is not the primary wireless communication medium for cellular telephones. Many cellular phones do not include a Bluetooth interface and, even if the phone does include a Bluetooth interface, users may turn off the Bluetooth interface. Consequently, many phones may not be capable of receiving signaling over the Bluetooth interface and therefore will not "receive" the instructions to switch from the ringing mode to the silent or vibratory mode. Furthermore, the range of Bluetooth transmissions is typically limited to less than approximately 30 m.

SUMMARY OF THE INVENTION

The present invention is directed to addressing the effects of one or more of the problems set forth above. The following presents a simplified summary of the invention in order to provide a basic understanding of some aspects of the invention. This summary is not an exhaustive overview of the invention. It is not intended to identify key or critical elements of the invention or to delineate the scope of the invention. Its sole purpose is to present some concepts in a simplified form as a prelude to the more detailed description that is discussed later.

In one embodiment of the present invention, a method is provided involving a base station and at least one mobile unit. The mobile unit is configured for communication with the base station using a first wireless communication medium. The method includes providing, over the first wireless communication medium, information indicating a modification to at least one configuration profile of the mobile unit. The configuration profile is associated with the first communication medium and the modification can be implemented by the mobile unit without user intervention. In another embodiment of the present invention, the method includes receiving, over the first wireless communication medium, the information indicating the modification to at least one configuration profile of the mobile unit.

BRIEF DESCRIPTION OF THE DRAWINGS

The invention may be understood by reference to the following description taken in conjunction with the accompanying drawings, in which like reference numerals identify like elements, and in which:

FIG. 3 conceptually illustrates one exemplary embodiment of a method of operating a base station, in accordance with the present invention; and FIG. 4 conceptually illustrates one exemplary embodiment of a method of operating a mobile unit, in accordance with the present invention.

Figure 1:
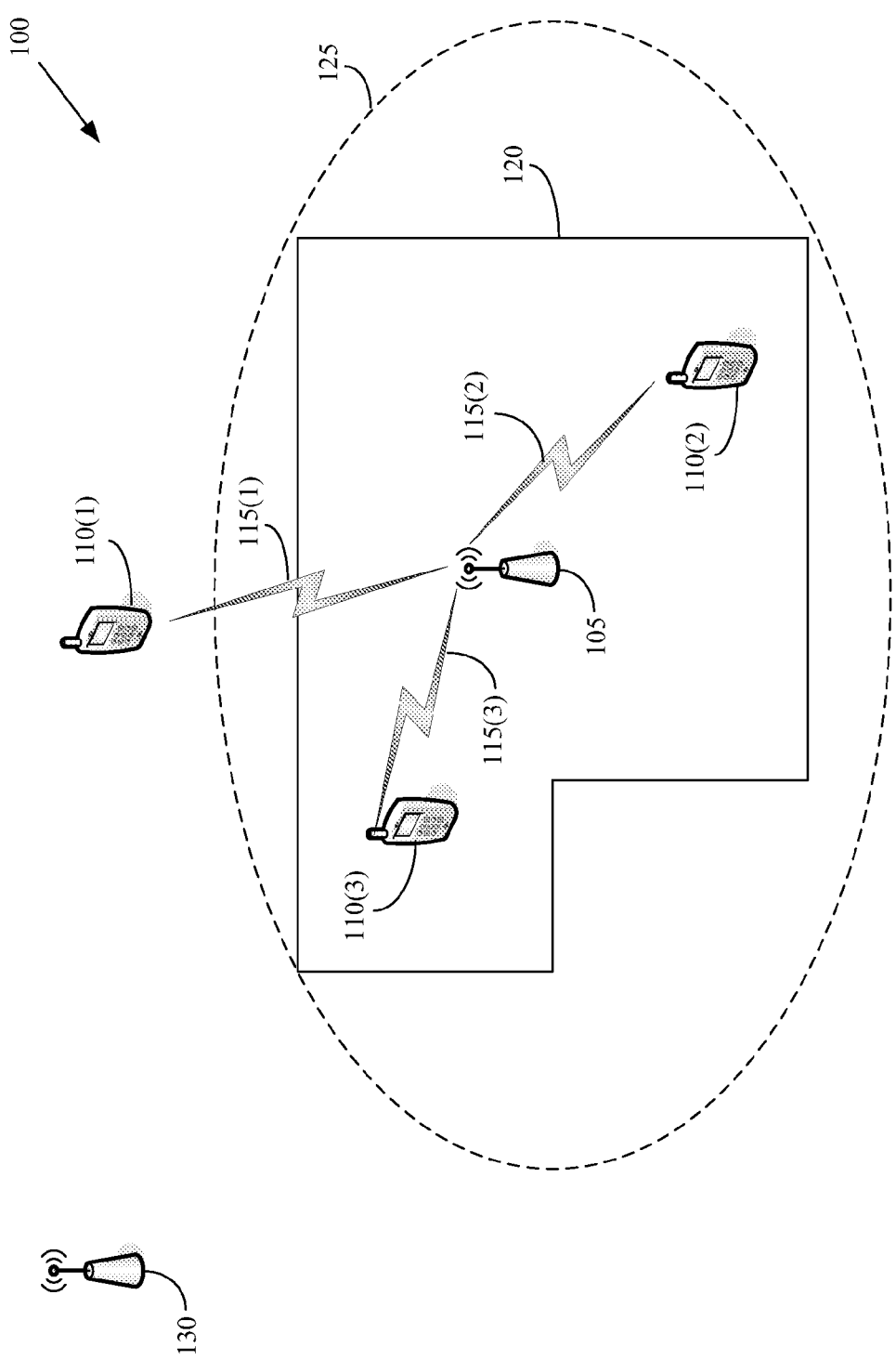
FIG. 1 conceptually illustrates one exemplary embodiment of a wireless communication system, in accordance with the present invention.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions should be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Portions of the present invention and corresponding detailed description are presented in terms of software, or algorithms and symbolic representations of operations on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of the invention are typically encoded on some form of program storage medium or implemented over some type of transmission medium. The program storage medium may be magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber, or some other suitable transmission medium known to the art. The invention is not limited by these aspects of any given implementation.

The present invention will now be described with reference to the attached figures. Various structures, systems and devices are schematically depicted in the drawings for purposes of explanation only and so as to not obscure the present invention with details that are well known to those skilled in the art. Nevertheless, the attached drawings are included to describe and explain illustrative examples of the present invention. The words and phrases used herein should be understood and interpreted to have a meaning consistent with the understanding of those words and phrases by those skilled in the relevant art. No special definition of a term or phrase, i.e., a definition that is different from the ordinary and customary meaning as understood by those skilled in the art, is intended to be implied by consistent usage of the term or phrase herein. To the extent that a term or phrase is intended to have a special meaning, i.e., a meaning other than that understood by skilled artisans, such a special definition will be expressly set forth in the specification in a definitional manner that directly and unequivocally provides the special definition for the term or phrase.

FIG. 1 conceptually illustrates one exemplary embodiment of a wireless communication system 100. In the illustrated embodiment, the wireless communication system 100 is configured to provide wireless connectivity according to Universal Mobile Telecommunication Services (UMTS) standards and/or protocols. However, persons of ordinary skill in the art having benefit of the present disclosure should appreciate that the present invention is not limited to wireless communication systems 100 that operate exclusively according to UMTS. In alternative embodiments, which may be practiced in place of or in addition to the illustrated embodiment, the wireless communication system 100 may also operate according to standards and/or protocols such as the Global System for Mobile communication (GSM), IEEE 802 or 806-type standards and/or protocols, WiMax standards and/or protocols, Bluetooth standards and/or protocols, and the like.

The wireless communication system 100 includes one or more base stations 105 for providing wireless connectivity to a geographical region proximate the base station 105. However, persons of ordinary skill in the art having benefit of the present disclosure should appreciate that the present invention is not limited to providing wireless connectivity using the base station 105. In alternative embodiments, other devices or combinations of devices may be used to provide wireless connectivity. For example, the wireless communication system 100 may include one or more access points, access networks, base station routers, and the like. Thus, the term "base station" will be understood to encompass other access devices including, but not limited to, access points, access networks, and base station routers. Furthermore, the present invention is not limited to any particular number of base stations 105 or other devices for providing wireless connectivity.

Mobile units 110(1-3) may access the wireless communication system 100 over air interfaces 115(1-3) with the base station 105. The indices (1-3) may be used to indicate individual mobile units 110(1-3) and/or air interfaces 115(1-3), as well as subsets thereof. However, the indices may be dropped when the mobile units 110 and/or air interfaces 115 are referred to collectively. This convention may also be applied to other elements shown in the drawings and indicated by an identifying numeral and a distinguishing index. The mobile units 110 are configured to communicate with the base station 105 using one or more wireless communication media. As used herein, the term "wireless communication medium" will be understood to refer to the interfaces and protocols in the mobile units 110 and/or base station 105 that are used communicate via the air interfaces 115 between these devices, as well as any software, firmware, and/or hardware that may be used to implement these interfaces and protocols. Each wireless communication medium may be characterized by a frequency range used transmit and/or receive signals, channels and/or subchannels within the frequency range, codes that are used to define these channels and/or sub-channels, and the like Each mobile unit 110 and/or base station 105 includes interfaces and protocols that permit the mobile unit 110 to transmit and/or receive signals in a particular frequency and/or band of frequencies associated with the wireless communication media that are supported by the mobile unit 110 and/or base station 105. One example of a wireless communication medium is the set of interfaces and protocols that may be used by the base station 105 and the mobile units 110 to communicate over the air interface 115 according to the UMTS standards and/or protocols. Another example of a wireless communication system is a set of interfaces and/or protocols that may be used by a mobile unit 110 to implement Bluetooth. Mobile units 110 and/or base stations 105 may implement more than one wireless communication medium. For example, a mobile unit 110 may implement both a cellular communication interface such as the UMTS interface, and a short range communication interface such as Bluetooth.

Each mobile unit 110 operates according to one or more configuration profiles that include information that indicates how the mobile unit 110 should perform in different circumstances. In one embodiment, a configuration profile includes information that indicates whether the mobile unit 110 is in a ringing mode, a vibratory mode, and/or a silent mode. For example, if the configuration profile of the mobile unit 110(1) indicates that the mobile unit 110(1) is in a ringing mode, then the mobile unit 110(1) provides an auditory signal such as a ring, a ring tone, a buzzer, and the like in response to a signal from the base station 105 indicating an incoming call. For another example, if the configuration profile of the mobile unit 110(1) indicates that the mobile unit 110(1) is in a vibratory mode, then the mobile unit 110(1) vibrates in response to a signal from the base station 105 indicating an incoming call.

Figure 2B:
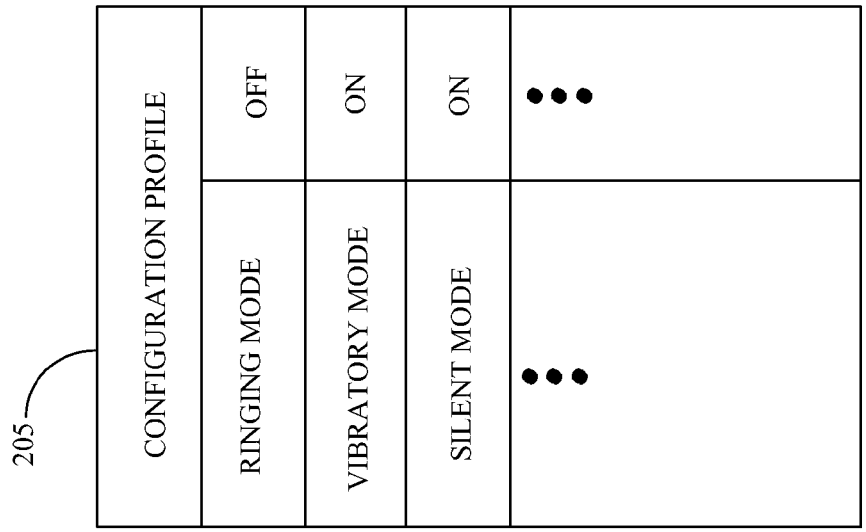
FIGS. 2A and 2B conceptually illustrate exemplary embodiments of a configuration profile and a modified configuration profile, respectively, in accordance with the present invention.
Figure 2A:
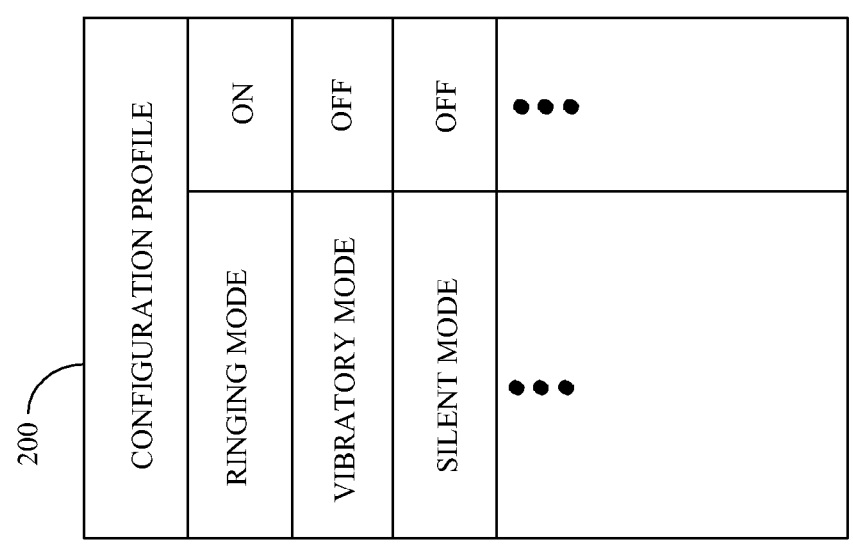

FIG. 2A conceptually illustrates one exemplary embodiment of a configuration profile 200. In the illustrated embodiment, the configuration profile 200 includes information indicating that the ringing mode is ON, the vibratory mode is OFF, and the silent mode is OFF. The configuration profile 200 may also include other configuration information that may be used by the mobile unit that is associated with this configuration profile 200. Persons of ordinary skill in the art having benefit of the present disclosure should appreciate that configuration profiles 200 may be implemented in software, firmware, hardware, or any combination thereof.

Referring back to FIG. 1, the base station 105 may provide information indicating one or more modifications to the configuration profile(s) of mobile units 110 that receive the information. This information is provided in messages that are transmitted using the same wireless communication medium that is used by the mobile units 110 to establish the air interfaces 115 with the base station 105. The provided information may instruct the mobile units 110 to implement the modifications to the configuration profiles without user intervention. For example, the base station 105 may provide a message over a broadcast channel that indicates that mobile units 110 that receive the message to modify their configuration profiles to turn off the ringing mode, or any other auditory signal that may be provided to the user, and turn on a non-auditory signal such as the vibratory mode and/or the silent mode. In one embodiment, the messages may also indicate that configuration profiles of other wireless communication media should be modified. For example, auto-configuration messages transmitted over a UMTS communication medium may be used to indicate that silent modes should be used for UMTS communications and communications using other wireless communication media, such as Bluetooth.

The transmission power of the base station 105, and/or the distribution of transmitted power, may be selected based upon a range for transmitted signals and/or a topology of the region proximate the base station 105. For example, the base station 105 may be configured so that only mobile units 110(2-3) that are within or very near the boundaries of a building 120 (e.g., the mobile units 110(2-3) that are within the dashed oval 125) are instructed to turn off auditory signals that may be provided to the user. The base station 105 may therefore transmit the information indicating that the configuration profiles should be modified at a power (or with a distribution) that is selected so that only mobile units 110(2-3) that are within or very near the boundaries of a building 120 receive and/or act upon the auto-configuration message. In one embodiment, the mobile units 110 only act on the information in the auto-configuration message if the received power associated with the message exceeds a selected threshold. The threshold may be communicated to the mobile units 110 by the wireless communication system 100 or maybe preprogrammed into the mobile units 110. The mobile units 110 may also revert to a previous or default configuration profile if the received power falls below the selected threshold.

FIG. 2B conceptually illustrates one exemplary embodiment of a modified configuration profile 205. In the illustrated embodiment, the modified configuration profile 205 has been modified to include information indicating that the ringing mode is OFF, the vibratory mode is ON, and the silent mode is ON. As discussed above, the configuration profile 205 may also include other configuration information and may be implemented in software, firmware, hardware, or any combination thereof. For example, the modified configuration profile 205 may correspond to a modified version of the configuration profile 200 shown in FIG. 2A. However, in the illustrated embodiment, the associated mobile unit has received and acted upon an auto-configuration message provided by a base station that instructed the mobile unit to turn off auditory signals and only provide non-auditory signals.

Referring back to FIG. 1, in one embodiment, the base station 105 may be the primary server for one or more of the mobile units 110. Accordingly, the mobile units 110 may receive voice and/or data signals from the base station 105, in addition to possibly receiving auto-configuration messages from the base station 105. However, the present invention is not limited to embodiments where the base station 105 is the primary server for any or all of the mobile units 110. For example, a base station 130 may act as the primary server for one or more of the mobile units 110. Accordingly, mobile units 110 may maintain an air interface to the base station 130 and may use the air interface to transmit and receive voice and/or data from the wireless communication system 100. The mobile units 110 that use the base station 130 as the primary server can also monitor one or more broadcast channels associated with the base station 105. These mobile units 110 can therefore detect signals and/or messages indicating changes to the configuration profile, e.g., auto-configuration messages indicating transitions to or from silent modes, which the base station 105 broadcasts over the broadcast channels.

FIG. 3 conceptually illustrates one exemplary embodiment of a method 300 of operating a base station. In the illustrated embodiment, the base station may select (at 305) a power level and/or a distribution for transmitting auto-configuration messages. For example, the base station may select (at 305) a transmission power level such that mobile units within a particular geographic region will receive transmitted auto-configuration messages at a received power that is above a particular threshold level. The base station may also select (at 305) a distribution for the transmitted power. For example, if the base station is capable of transmitting into three sectors, the transmission power associated with each sector may be selected (at 305) based on the region in which mobile units should receive and act on auto-configuration messages provided by the base station.

The base station may then transmit (at 310) the auto-configuration information using the wireless communication medium that is used by the base station and the mobile unit for other communication, e.g., the wireless communication medium that would carry messages that may result in an auditory signal being provided by the mobile unit. In one embodiment, messages including the auto-configuration message may be transmitted (at 310) at a predetermined interval. The messages may be transmitted (at 310) substantially continuously or only during selected periods of time. For example, a base station that is located in a symphony hall may only transmit auto-configuration messages during times that the symphony hall is being used for performances. In one embodiment, the base station may also transmit (at 315) information indicating a power threshold that should be used by mobile units one determining whether or not to act upon the auto-configuration messages. However, this step is optional and not necessary for the practice of the present invention. For example, the mobile units may be pre-programmed with the appropriate power threshold.

FIG. 4 conceptually illustrates one exemplary embodiment of a method 400 of operating a mobile unit. In the illustrated embodiment, the mobile unit initiates (at 405) a listening mode in which the mobile unit monitors one or more channels for auto-configuration messages that may be provided by one or more base stations. The mobile unit may initiate (at 405) the listening mode in response to being powered up and made available for communication over a wireless communication medium or, alternatively, the mobile unit may initiate (at 405) the listening mode in response to the mobile unit being placed in a mode that may result in the mobile unit providing an auditory signal in response to messages provided over the wireless communication medium, such as a ringing mode. The mobile unit may then listen (at 410) for auto-configuration messages. In the illustrated embodiment, the mobile unit listens (at 410) by monitoring one or more channels associated with the wireless communication medium that also may transmit messages that result in auditory signals being provided by the mobile unit, such as a broadcast channel (BCCH). However, the mobile unit may, in alternative embodiments, listen (at 410) to other channels.

The mobile unit determines (at 415) whether or not an auto-configuration packet has been received. As long as no auto-configuration packets have been received, the mobile unit may continue to listen (at 410) for incoming auto-configuration packets. If the mobile unit determines (at 415) that an auto configuration packet has been received, then the mobile unit may determine (at 420) whether the received power associated with the received packet is larger than a predetermined threshold ($P_T$). If the received power is larger than the predetermined threshold, then the mobile unit may proceed to reconfigure (at 425) one or more configuration profiles as indicated in the auto-configuration packet without user intervention. For example, the configuration profile may be modified so that the mobile unit turns off the ringing mode and turns on the vibratory and/or silent modes. If the received power is not larger than the predetermined threshold, then the mobile unit may discard the packet and continue to listen (at 410) for additional auto-configuration packets. In one embodiment, the mobile unit may also revert to a previous or default value of one or more configuration profiles in response to determining that the received power is less than the power threshold.

Providing auto-configuration messages, such as messages indicating that a mobile unit should be reconfigured to turn off auditory signaling without user intervention or input, may have a number of advantages over conventional practice. Visitors to public places, such as restaurants, hospitals, movie theaters, and the like, may be relieved of the burden of remembering to set their mobile telephones in the silent mode or the vibration mode so as not to disturb the others. Thus, even forgetful users may be spared the embarrassment and/or irritation of unexpected ringing. However, users may still be able to receive calls (including emergency calls) and/or place calls (including emergency calls). Furthermore, since the auto-configuration messages are transmitted over the primary wireless communication medium any mobile unit that is capable of receiving transmissions over the primary wireless communication medium will "hear" the instructions to switch from the ringing mode to the silent or vibratory mode.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope of the invention. Accordingly, the protection sought herein is as set forth in the claims below.

What is claimed:

1. A method, comprising:
  selecting, at a base station, at least one of a transmission power level or a transmission power distribution for a broadcast over a broadcast channel of a first wireless communication medium,
  wherein the selection is based upon at least one of a range associated with a base station and a topology proximate the base station so that mobile units outside a predetermined geographic area receive the broadcast at a received power that is less than a selected threshold so that mobile units outside the predetermined geographic area do not implement modifications to their configuration profiles without user intervention; and
  broadcasting, from the base station over the broadcast channel using said at least one transmission power or transmission power distribution, information indicating a modification to at least one configuration profile of at least one mobile unit,
  wherein the configuration profile is associated with the first communication medium;
  wherein the modification is implemented by said at least one mobile unit without user intervention in response to said at least one mobile unit determining that it has received the broadcast at a received power level that is above the selected threshold, and
  wherein the base station broadcasts said information using at least one of the transmission power level or the transmission power distribution selected so that only mobile units within a predetermined geographic area receive the information at the received power level that is above the selected threshold.

2. The method of claim 1, wherein providing the information indicating the modification comprises providing information indicating that said at least one mobile unit is to provide a non-auditory signal in response to receiving information over the first wireless communication medium.

3. The method of claim 1, wherein the information comprises information indicating that the mobile unit is to provide a non-auditory signal in response to receiving information over at least one second wireless communication medium.

4. A method, comprising:
  receiving, at a mobile unit over a broadcast channel of a first wireless communication medium, information indicating a modification to at least one configuration profile of the mobile unit, the configuration profile being associated with the first communication medium;
  implementing the modification to said at least one configuration profile without user intervention in response to the mobile unit determining that a received power level of the broadcast information is above a selected threshold at the mobile unit; and
  bypassing implementation of the modification to said at least one configuration profile without user intervention in response to the mobile unit determining that that the received power level of the broadcast information is below the selected threshold at the mobile unit,
  wherein the threshold is selected by a base station based upon at least one of a range associated with the base station and a topology proximate the base station so that mobile units outside a predetermined geographic area receive the broadcast at a received power that is less than the selected threshold so that mobile units outside the predetermined geographic area do not implement modifications to their configuration profiles without user intervention.

5. The method of claim 4, wherein receiving the information indicating the modification comprises receiving information indicating that the mobile unit is to provide a non-auditory signal in response to receiving information over the first wireless communication medium.

6. The method of claim 4, wherein the information comprises information indicating that the mobile unit is to provide a non-auditory signal in response to receiving information over at least one second wireless communication medium.

7. The method of claim 4, wherein receiving the information indicating the modification comprises receiving at least one packet over a broadcast channel.

8. The method of claim 4, comprising determining whether to listen for the information indicating the modification based on at least one current configuration profile of said at least one mobile unit.

9. The method of claim 4, comprising discarding the information indicating the modification when the received power level is below a selected threshold level.

10. The method of claim 4, comprising resetting said at least one configuration profile to the pre-modification configuration profile if the received power level is below the selected threshold.

11. The method of claim 4, comprising maintaining a wireless communication link with at least one other base station concurrently with receiving the information indicating the modification to at least one configuration profile from the base station.

12. The method of claim 1, comprising:
selecting the threshold; and
transmitting information indicating the selected threshold from the base station to said at least one mobile unit.

13. The method of claim 4, comprising receiving information indicating the selected threshold from the base station.

14. The method of claim 1, comprising selecting at least one of the power level and the distribution based upon a boundary of a building.

15. The method of claim 14, wherein selecting at least one of the power level and the distribution based upon the boundary of the building comprises selecting at least one of the power level and the distribution so that the power level of the broadcast information is at the selected threshold at or near the boundary of the building.

16. A method, comprising:
selecting, at a base station, at least one of a power level or a power distribution so that a power level of information broadcast from the base station over a broadcast channel is at a threshold near a boundary of an oval encompassing a building; and
broadcasting, from the base station over the broadcast channel, information indicating a modification to at least one configuration profile,
wherein the information is broadcast at the selected power level or power distribution so that the power level of the broadcast information is at the threshold near the boundary of the oval encompassing the building and only mobile units that receive the broadcast information at a received power level above the threshold implement the indicated modification.

17. The method of claim 16, wherein broadcasting the information comprises broadcasting information instructing mobile units to turn off auditory signals that may be provided to users.

18. The method of claim 16, wherein broadcasting the information comprises broadcasting information indicating the modification is to be implemented without user intervention when the received power level is above the threshold.

* * * * *